(12) United States Patent
Sharma

(10) Patent No.: US 10,978,018 B2
(45) Date of Patent: Apr. 13, 2021

(54) VIRTUAL REALITY RESOURCE MANAGEMENT FOR VIRTUAL REALITY HEAD MOUNTED DISPLAY DEVICES

(71) Applicant: Samsung Electronics Co., Ltd., Suwon-si (KR)

(72) Inventor: Priyanka Sharma, Cupertino, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 5 days.

(21) Appl. No.: 16/195,623

(22) Filed: Nov. 19, 2018

(65) Prior Publication Data
US 2019/0371259 A1 Dec. 5, 2019

Related U.S. Application Data

(60) Provisional application No. 62/677,568, filed on May 29, 2018.

(51) Int. Cl.
*G09G 5/00* (2006.01)
*G06F 3/0484* (2013.01)
*G06F 3/0482* (2013.01)

(52) U.S. Cl.
CPC .......... *G09G 5/003* (2013.01); *G06F 3/0482* (2013.01); *G06F 3/04847* (2013.01); *G09G 2330/021* (2013.01); *G09G 2354/00* (2013.01); *G09G 2370/02* (2013.01)

(58) Field of Classification Search
CPC ............... G09G 5/003; G09G 2370/02; G09G 2354/00; G09G 2330/021; G09G 2360/12; G09G 2360/08; G09G 5/14; G06F 3/0482; G06F 3/04847; G06F 3/14; G06F 3/012

USPC ......................................................... 715/771
See application file for complete search history.

(56) References Cited

U.S. PATENT DOCUMENTS

| | | | |
|---|---|---|---|
| 8,016,670 B2 | 9/2011 | LeMay et al. | |
| 8,032,010 B2 | 10/2011 | Kim et al. | |
| 8,760,503 B2 | 6/2014 | Yoo et al. | |
| 9,836,114 B1 * | 12/2017 | Lim | G06F 1/3293 |
| 2011/0307900 A1 | 12/2011 | Fatehpuria et al. | |
| 2013/0083064 A1 | 4/2013 | Geisner et al. | |

(Continued)

FOREIGN PATENT DOCUMENTS

| CN | 205829707 U | 12/2016 |
|---|---|---|
| CN | 106775996 A | 5/2017 |

(Continued)

OTHER PUBLICATIONS

International Search Report dated Jul. 18, 2019 in connection with International Patent Application No. PCT/KR2019/004604, 3 pages.

(Continued)

*Primary Examiner* — Andrey Belousov

(57) ABSTRACT

A virtual reality (VR) head mounted display (HMD) includes a display, a processor coupled to the display, and a memory coupled to the processor. The memory includes instructions executable by the processor to determine that the available capacity of a resource supporting VR operations being executed by the processor is insufficient and present a graphical user interface on the display with at least one selectable option to reduce usage of at least one resource supporting at least one of non-VR operations and inactive VR operations.

20 Claims, 7 Drawing Sheets

(56) References Cited

U.S. PATENT DOCUMENTS

| | | | |
|---|---|---|---|
| 2015/0248235 A1* | 9/2015 | Offenberg | G06F 3/017 |
| | | | 715/773 |
| 2015/0312341 A1 | 10/2015 | Smith | |
| 2015/0373116 A1* | 12/2015 | Mo | G06F 3/0649 |
| | | | 709/219 |
| 2017/0090814 A1 | 3/2017 | Yeung et al. | |
| 2018/0120826 A1 | 5/2018 | Rhim | |

FOREIGN PATENT DOCUMENTS

| | | |
|---|---|---|
| EP | 3104252 A1 | 12/2016 |
| JP | 2017-204225 A | 11/2017 |
| KR | 10-2014-0056749 A | 5/2014 |
| WO | 2017/033992 A1 | 3/2017 |

OTHER PUBLICATIONS

Written Opinion of the International Searching Authority dated Jul. 18, 2019 in connection with International Patent Application No. PCT/KR2019/004604, 4 pages.

\* cited by examiner

VIRTUAL REALITY RESOURCE MANAGEMENT FOR VIRTUAL REALITY HEAD MOUNTED DISPLAY DEVICES

CROSS-REFERENCE TO RELATED APPLICATION

The present application claims the benefit of U.S. Provisional Patent Application Ser. No. 62/677,568, filed May 29, 2018, which is incorporated herein by reference in its entirety for all purposes.

FIELD OF INVENTION

The present invention relates in general to virtual reality systems and in particular virtual reality resource management for virtual reality head mounted devices.

BACKGROUND OF INVENTION

Virtual reality (VR) headsets, including standalone and drop-in VR headset devices, typically have limited resources, including limited storage (non-volatile memory) space, limited volatile memory, and limited battery power. When the limits on an available resource are reached, the user generally must stop the virtual reality experience to address the issue. For example, the user may be forced to take off the headset, change memory settings, reset operating parameters, address a new source of power, and so on. Hence, solutions to the problems caused by limited resources are needed to improved user experiences while experiencing virtual reality.

SUMMARY OF INVENTION

The principles of the present invention are embodied in a system and method for managing resources in virtual reality applications. Aspects of such embodiments include accessing off-device storage without the need for the user to remove the head mounted display (HMD) device, thereby keeping the user in the virtual reality experience. Other embodiments include allowing the user to continue to operate an HDM device in a lower-performance mode or transfer non-essential content to off-device storage.

In a first embodiment, virtual reality (VR) head mounted display (HMD) device is provided. The VR HMD device includes a display, a processor coupled to the display, and a memory coupled to the processor. The processor is configured to: determine that the available capacity of a resource supporting VR operations being executed by the processor is insufficient; and present a graphical user interface on the display with at least one selectable option to reduce usage of at least one resource supporting at least one of non-VR operations and inactive VR operations.

In a second embodiment, a method of operating a virtual reality (VR) head mounted display (HMD) device is provided. The VR HMD device includes a processor, a display coupled to the processor, and a memory coupled to the processor and including instructions executable by the processor. The method includes determining, by executing selected instructions from the memory with the processor, that the available capacity of a resource supporting VR operations being executed by the processor is insufficient. The method also includes displaying on the display, by executing selected instructions from the memory with the processor, a graphical user interface with at least one selectable option to reduce usage of at least one resource supporting at least one of non-VR operations and inactive VR operations.

In a third embodiment, a non-transitory computer readable medium configured to store a program code is provided. The program code, when executed by a processor, are configured to cause the at least one processor to, determine that the available capacity of a resource supporting VR operations being executed by the processor is insufficient; and display on the HMD a graphical user interface with at least one selectable option to reduce usage of at least one resource supporting at least one of non-VR operations and inactive VR operations.

Before undertaking the DETAILED DESCRIPTION below, it may be advantageous to set forth definitions of certain words and phrases used throughout this patent document. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

As used herein, the terms "have," "may have," "include," "may include," "can have," or "can include" a feature (e.g., a number, function, operation, or a component such as a part) indicate the existence of the feature and do not exclude the existence of other features.

As used herein, the terms "A or B," "at least one of A and/or B," or "one or more of A and/or B" may include all possible combinations of A and B. For example, "A or B," "at least one of A and B," "at least one of A or B" may indicate all of (1) including at least one A, (2) including at least one B, or (3) including at least one A and at least one B.

As used herein, the terms "first" and "second" may modify various components regardless of importance and do not limit the components. These terms are only used to distinguish one component from another. For example, a first user device and a second user device may indicate different user devices from each other regardless of the order or importance of the devices. For example, a first component may be denoted a second component, and vice versa without departing from the scope of the present disclosure.

It will be understood that when an element (e.g., a first element) is referred to as being (operatively or communicatively) "coupled with/to," or "connected with/to" another element (e.g., a second element), it can be coupled or connected with/to the other element directly or via a third element. In contrast, it will be understood that when an element (e.g., a first element) is referred to as being "directly coupled with/to" or "directly connected with/to" another element (e.g., a second element), no other element (e.g., a third element) intervenes between the element and the other element.

As used herein, the terms "configured (or set) to" may be interchangeably used with the terms "suitable for," "having the capacity to," "designed to," "adapted to," "made to," or "capable of" depending on circumstances. The term "configured (or set) to" does not essentially mean "specifically designed in hardware to." Rather, the term "configured to" may mean that a device can perform an operation together with another device or parts.

For example, the term "processor configured (or set) to perform A, B, and C" may mean a generic-purpose processor (e.g., a CPU or application processor) that may perform the operations by executing one or more software programs stored in a memory device or a dedicated processor (e.g., an embedded processor) for performing the operations.

The terms as used herein are provided merely to describe some embodiments thereof, but not to limit the scope of other embodiments of the present disclosure. It is to be understood that the singular forms "a," "an," and "the" include plural references unless the context clearly dictates otherwise. All terms including technical and scientific terms used herein have the same meaning as commonly understood by one of ordinary skill in the art to which the embodiments of the present disclosure belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein. In some cases, the terms defined herein may be interpreted to exclude embodiments of the present disclosure.

For example, examples of the electronic device according to embodiments of the present disclosure may include at least one of a smartphone, a tablet personal computer (PC), a mobile phone, a video phone, an e-book reader, a desktop PC, a laptop computer, a netbook computer, a workstation, a PDA (personal digital assistant), a portable multimedia player (PMP), an MP3 player, a mobile medical device, a camera, or a wearable device (e.g., smart glasses, a head-mounted device (HMD), electronic clothes, an electronic bracelet, an electronic necklace, an electronic accessory, an electronic tattoo, a smart mirror, or a smart watch).

Definitions for other certain words and phrases are provided throughout this patent document. Those of ordinary skill in the art should understand that in many if not most instances, such definitions apply to prior as well as future uses of such defined words and phrases.

According to embodiments of the present disclosure, the electronic device can be a smart home appliance. Examples of the smart home appliance can include at least one of a television, a digital video disk (DVD) player, an audio player, a refrigerator, an air conditioner, a cleaner, an oven, a microwave oven, a washer, a drier, an air cleaner, a set-top box, a home automation control panel, a security control panel, a TV box (e.g., Samsung HomeSync™ APPLE TV™, or GOOGLE TV™), a gaming console (XBOX™, PLAYSTATION™), an electronic dictionary, an electronic key, a camcorder, or an electronic picture frame.

According to certain embodiments of the present disclosure, examples of the electronic device can include at least one of various medical devices (e.g., diverse portable medical measuring devices (a blood sugar measuring device, a heartbeat measuring device, or a body temperature measuring device), a magnetic resource angiography (MRA) device, a magnetic resource imaging (MRI) device, a computed tomography (CT) device, an imaging device, or an ultrasonic device), a navigation device, a global positioning system (GPS) receiver, an event data recorder (EDR), a flight data recorder (FDR), an automotive infotainment device, an sailing electronic device (e.g., a sailing navigation device or a gyro compass), avionics, security devices, vehicular head units, industrial or home robots, automatic teller's machines (ATMs), point of sales (POS) devices, or Internet of Things devices (e.g., a bulb, various sensors, an electric or gas meter, a sprinkler, a fire alarm, a thermostat, a street light, a toaster, fitness equipment, a hot water tank, a heater, or a boiler).

According to certain embodiments of the disclosure, the electronic device can be at least one of a part of a piece of furniture or building/structure, an electronic board, an electronic signature receiving device, a projector, or various measurement devices (e.g., devices for measuring water, electricity, gas, or electromagnetic waves).

According to embodiments of the present disclosure, the electronic device is one or a combination of the above-listed devices. According to embodiments of the present disclosure, the electronic device is a flexible electronic device. The electronic device disclosed herein is not limited to the above-listed devices, and can include new electronic devices depending on the development of technology.

As used herein, the term "user" may denote a human or another device (e.g., an artificial intelligent electronic device) using the electronic device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF DRAWINGS

For a more complete understanding of the principles of present invention, and the advantages thereof, reference is now made to the following descriptions taken in conjunction with the accompanying drawings, in which.

DETAILED DESCRIPTION OF THE INVENTION

FIGS. 1 through 7, discussed below, and the various embodiments used to describe the principles of this disclosure in this patent document are by way of illustration only and should not be construed in any way to limit the scope of the disclosure. Those skilled in the art will understand that the principles of this disclosure can be implemented in any suitably arranged system.

Hereinafter, embodiments of the present disclosure are described with reference to the accompanying drawings. However, it should be appreciated that the present disclosure is not limited to the illustrated embodiments and all changes and/or equivalents or replacements thereto also belong to the scope of the present disclosure. The same or similar reference denotations may be used to refer to the same or similar elements throughout the specification and the drawings.

Figure 1:
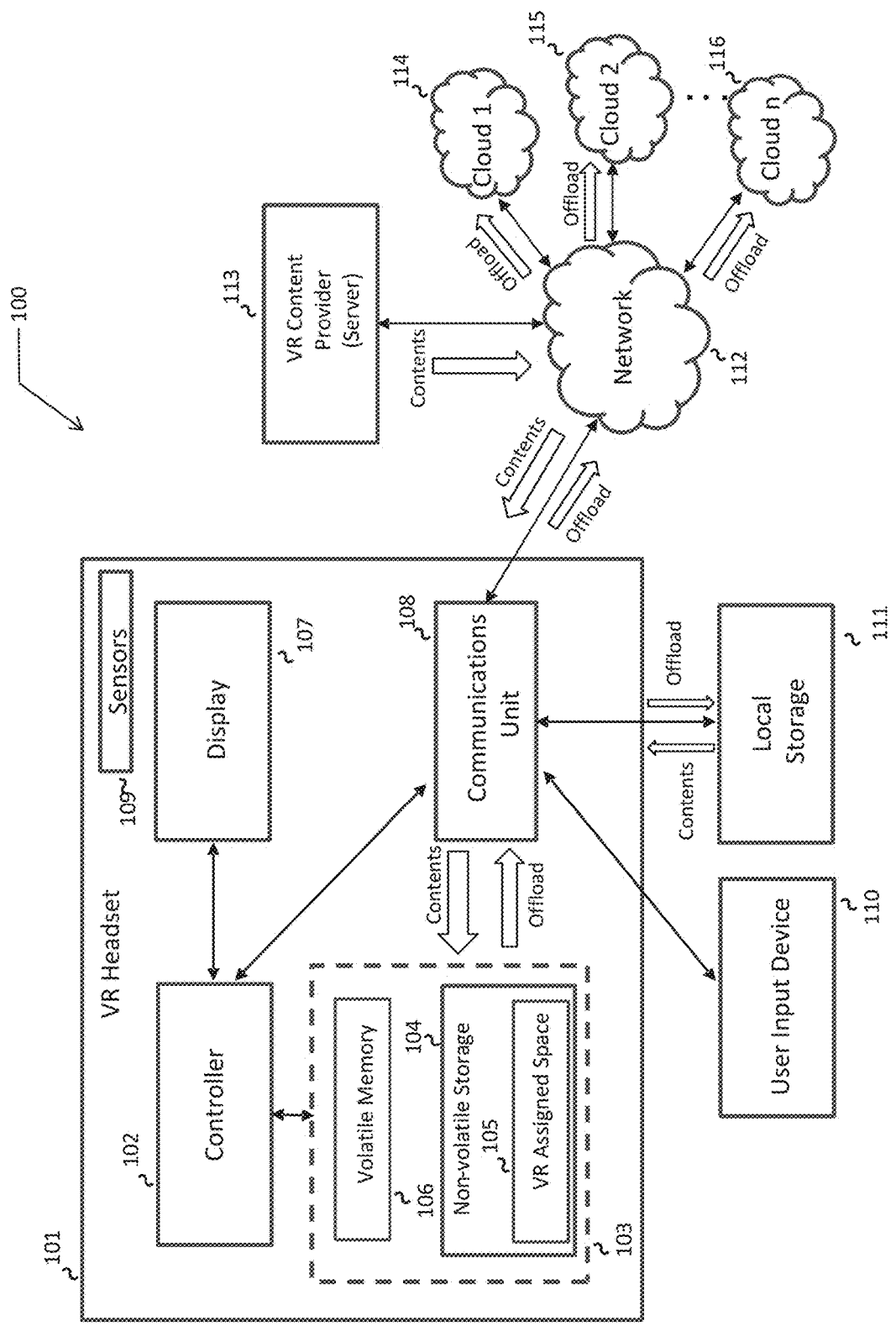
FIG. 1 is a high level diagram of an virtual reality (VR) system suitable for describing exemplary embodiments of the present disclosure.

FIG. 1 is a high-level diagram of a VR system 100 suitable for describing exemplary embodiments of the present inventive principles. VR system 100 includes a VR headset (i.e., head-mounted display or HMD) device 100, which may be a stand-alone VR HMD or a drop-in device (e.g., a device where the display and/or data processing functions are provided by a removable unit, such as a mobile phone).

VR HMD device 100 includes a controller 102, which in some embodiments, is a set of processors or controllers, such as a central processing unit (CPU), an application processor (AP), and/or a communication processor (CP). Generally, controller 102 performs control on at least one of the other components of VR HMD device 100, and/or performs operations or data processing relating to communications. Exemplary operations performed by controller 120 in a VR environment are discussed further below with regards to FIG. 2.

Controller 102 operates in conjunction with a memory/storage unit 103, which in the example of FIG. 1 includes non-volatile storage 104 having a VR assigned space 105 for storing VR contents downloaded to VR HDM 101. The size of VR assigned space 105 is variable and depends, among other things, on the amount of non-volatile storage 104 required to store contents (e.g., data and instructions) required for non-VR applications, as well as the amount of VR content already downloaded and stored.

Memory/storage unit 103 also includes volatile memory, which stores data and instructions needed by controller 102 for executing active apps. These active apps may include apps that are unrelated or unnecessary to a currently executed VR app.

VR HMD device 101 also includes a display 107. Display 107 may be, for example, a liquid crystal display (LCD), a light emitting diode (LED) display, an organic light emitting diode (OLED) display, or a microelectromechanical systems (MEMS) display.

A communications unit 108 allows VR HMD device 101 to communicate with external devices and/or systems. For example, communications unit 108 may serve as an interface that may, transfer commands or data input from a user or other external devices to other component(s) of VR HMD device 101. Further, communications unit 108 may output commands or data received from other component(s) of electronic device 101 to the user or the other external device.

Communications unit 108 may support wireless and/or wired communication with external devices and systems. The wireless communication may use at least one of, e.g., long term evolution (LTE), long term evolution-advanced (LTE-A), code division multiple access (CDMA), wideband code division multiple access (WCDMA), universal mobile telecommunication system (UMTS), wireless broadband (WiBro), or global system for mobile communication (GSM), as a cellular communication protocol. The wired connection may include at least one of universal serial bus (USB), high definition multimedia interface (HDMI), recommended standard 232 (RS-232), or plain old telephone service (POTS).

A user input device 110 exchanges commands and data with VR HDM device 101 through either a wired or wireless connection with communications unit 108. User input/output device 110 may be anyone of a number of devices, such as a gaming controller, electronic pen, or other device that allows a user to respond to information displayed on display 107 through a touch, gesture, proximity or hovering input. In some embodiments, the user input device 110 is part of the VR headset 101, e.g., a touchpad, physical buttons, joystick, and the like, located on a surface of the device.

Communications unit 108 can communicate with local storage (i.e., off-headset non-volatile storage) 111, which may be a stand-alone device, such as a solid state drive (SSD) or storage within another device or system, such as a gaming console, network attached storage (NAS), a desktop computer, and the like. In addition, communications unit 108 also can communicate with server 113, acting as a VR content provider, through a network 112. Network 112 may include at least one communications or computer network, such as a local area network (LAN) or wide area network (WAN)), Internet, or telephone network. Network 112 provides connectivity with at least one cloud storage (shown herein Cloud 1 114, a Cloud 2 115, all the way to a Cloud n 116). It should be noted that 'n' is used to denote that there can be any number of cloud storage allowing alternative embodiments ranging from 1 to 'n' number of available storage. Optionally, such cloud storage may be free, paid, or a mixture thereof.

Figure 2:
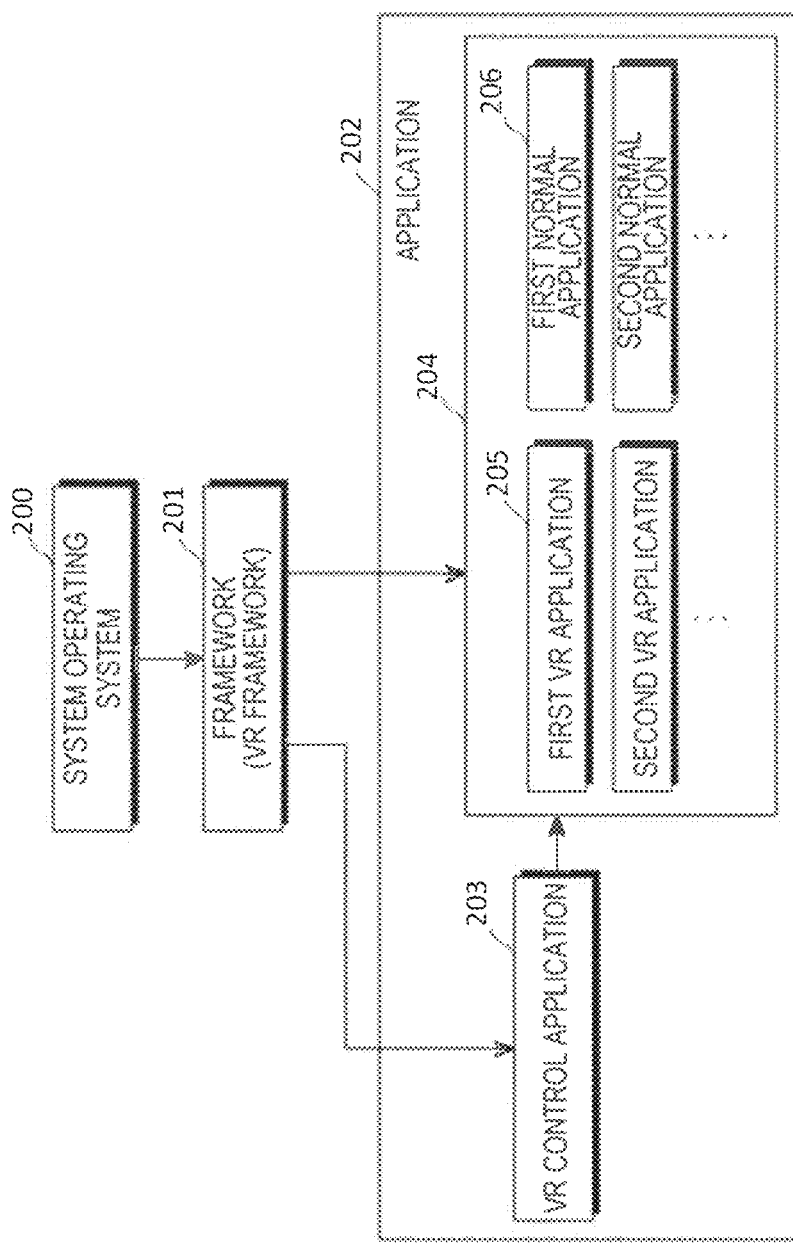
FIG. 2 is a block diagram illustrating an exemplary program module according to embodiments of the present disclosure.

FIG. 2 is a block diagram illustrating a program module, executable on controller 102 of VR HMD device 101, according to an embodiment of the present invention. In this example, the program module may include a system operating system (OS) 200, a framework 201, and an application 202.

OS 200 may include at least one system resource manager and/or at least one device driver. The system resource manager may execute, for example, control and allocation operations, and recover system resources. In particular embodiments, the system resource manager may include a memory manager, or a file system manager. The device driver may include a display driver, a camera driver, a BLUETOOTH driver, a shared memory driver, a USB driver, a keypad driver, a Wi-Fi driver, an audio driver, or an inter-process communication (IPC) driver.

According to an embodiment of the present invention, framework 201 (e.g., middleware) may implement, for example, functions commonly required for the execution of applications or support applications with various functions through the API to allow the application to efficiently use limited system resources inside electronic VR HMD device 101.

According to an embodiment of the present invention, a VR framework is included in framework 201, may control functions for running VR mode operations, and may control at least one application 202 to support the VR mode on VR HMD device 101. In particular, application 202 may include a plurality of applications 204, which may include at least one VR application 205 running in the VR mode and at least one normal application 206 running in a normal mode. Application 202 may further include a VR control application 203, which may control at least one VR application 205 and/or at least one normal application 206.

It should be recognized that the embodiment described in connection with FIG. 2 is an example for implementing the principles of the present invention in the form of a program, and embodiments of the present invention are not limited thereto. Further, while the embodiment described in connection with FIG. 2 references VR, it may be applied to other scenarios such as augmented reality, mixed reality, etc. In such embodiments, the VR portions or components may be utilized to enable the augmented reality or mixed reality aspects. (Collectively the various reality scenarios may be referenced herein as XR.)

Figure 3:
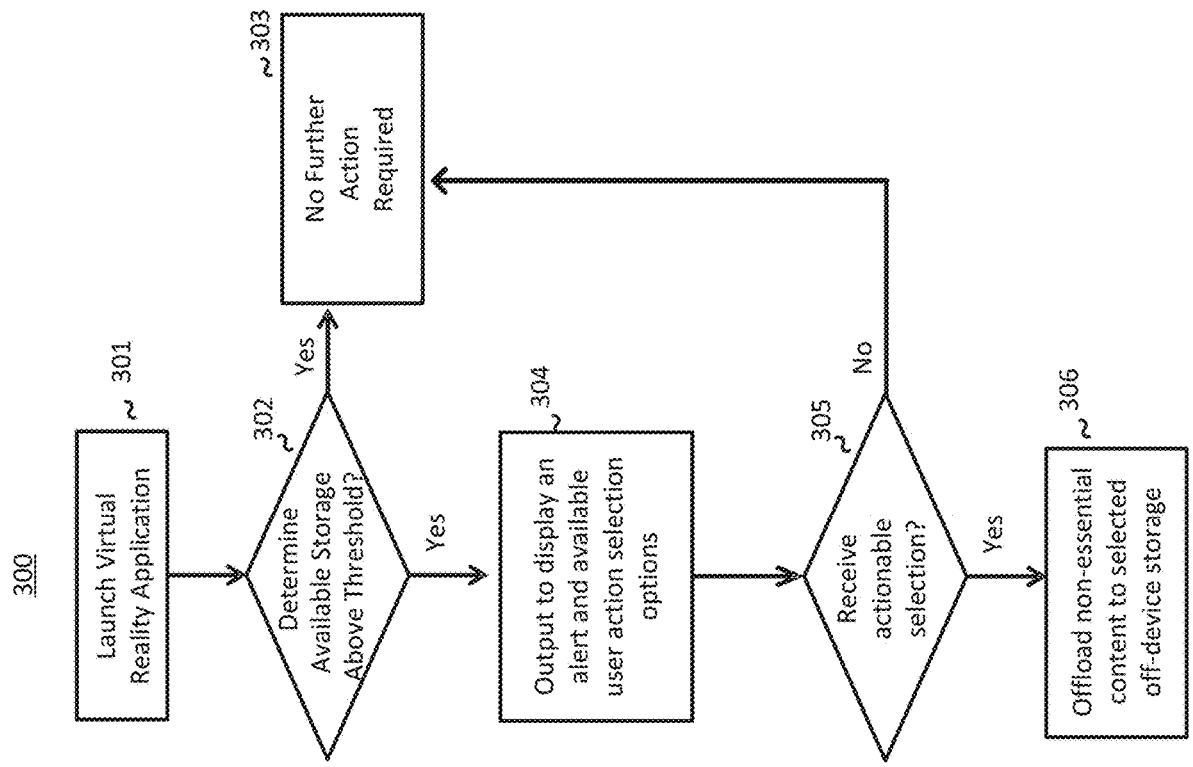
FIG. 3 illustrates an exemplary procedure allowing a user to manage low VR storage events.

FIG. 3 is a flowchart of an exemplary procedure 300 for managing VR storage in VR HMD device 101 of FIG. 1 according to embodiments of the present disclosure. While the flow chart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The process depicted in the example depicted is implemented by a processor in, for example, a head mounted electronic device or a wearable electronic device.

At Block 301, controller 102 launches a selected VR app and starts downloading VR content to VR HMD device 101 from VR content provider 113. Optionally, the VR application may be retrieved from remote storage (e.g., cloud 1, cloud 2, cloud n, etc.) or locally stored on the VR HMD device 101. So long as the HMD device 101 determines sufficient available storage (e.g., available VR assigned space 105) remains at Block 302, then no further action is required at Block 303. In one embodiment, when controller 102 is downloading VR content from VR content provider 113 and the amount of remaining non-volatile storage 104 is about to reach a threshold for a particular type of application (e.g., VR), controller 102 outputs to the display 107 of VR HMD device 101 a notification (alert) (e.g., as a pop-up), along with available user action selection options (Block 304). Such a threshold, for example, may be 15% of the total storage space 104. Such a threshold may be pre-set and in some embodiments may be user adjustable. The displayed notification may include information indicating the amount of space available in the VR assigned space 105 and/or the available storage in the non-VR assigned portion of non-volatile memory 104.

Figure 4A:
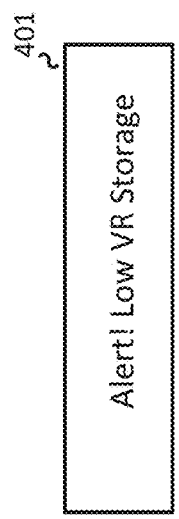
FIGS. 4A-4E illustrate exemplary messages presented on a VR headset display screen allowing a user to manage low VR operating resources events.

FIG. 4A shows an exemplary pop-up 401 generated by controller 102 on the display 107 of VR HMD device 101, which alerts the user to low remaining availability in VR assigned space 105. The user is provided options, for example through the pop-up 405 of FIG. 4E, also generated by controller 102 on the display 107 of VR HMD device 101, to offload non-essential content (e.g., non-VR content, or unnecessary VR content) to one or more of Cloud 1 114, Cloud 2 115, paid Cloud n 116, or local storage 111 of FIG. 1, without disturbing the VR experience. If controller 102 receives an actionable selection from the user through the user input device 110 at Block 305, then the non-essential content is offloaded to the selected off-device storage (Block 306). The user may also elect not to take any further action at Blocks 305 and procedure 300 returns to Block 303 and no further action is taken.

In one embodiment of the inventive principles, a memory management program automatically stores existing contents within non-volatile memory 104 to other storage locations based on the user's selection or a default setting and the type of content (i.e., VR and non-VR). For example, the memory management program may filter the VR and non-VR content to optimize storage and address of all kind of content before exhausting non-volatile storage 104. In one embodiment, the movement of non-essential content may occur when the mobile device is not in VR mode.

In one embodiment, the VR HMD device 101 can detect when the headset is being worn using sensors 109 (e.g., proximity sensors, ambient light sensors, pressure sensors, connected to and/or disposed on VR HMD device 101. Alternatively, the VR HMD device 101 may determine when VR applications, such as VR applications 205 of FIG., are being launched. Either aspect can allow VR HMD device 101 to sense when it is entering VR mode. VR HMD device 101 may then offload the non-essential content to the selected storage location. When VR HMD device 101 is exiting VR mode, the offloaded non-essential content can be retrieved from the selected storage location and the current VR content offloaded to the selected storage location. VR HMD device 101 can then retrieve the VR content when VR HMD device 101 next enters VR mode.

In an embodiment, VR HMD device 101 can detect whether given content is VR content using any one of a number of methods, which can allow filtering of the content early to avoid exhausting the storage space of the non-volatile storage 104. One representative method is to utilize known flags in the metadata of the device (e.g., com.samsung.android.vr.application.mode, vr_only, vr_dual, com.google.intent.category.CARDBOARD). Another method may be to examine the manifest files with APIs for content detection. A further method may utilize image processing to detect particular known logos or icons for VR applications (e.g., the GEAR VR logo is detected at center uppermost position), an upper right corner location of a settings icon for DAYDREAM, etc.).

Figure 5:
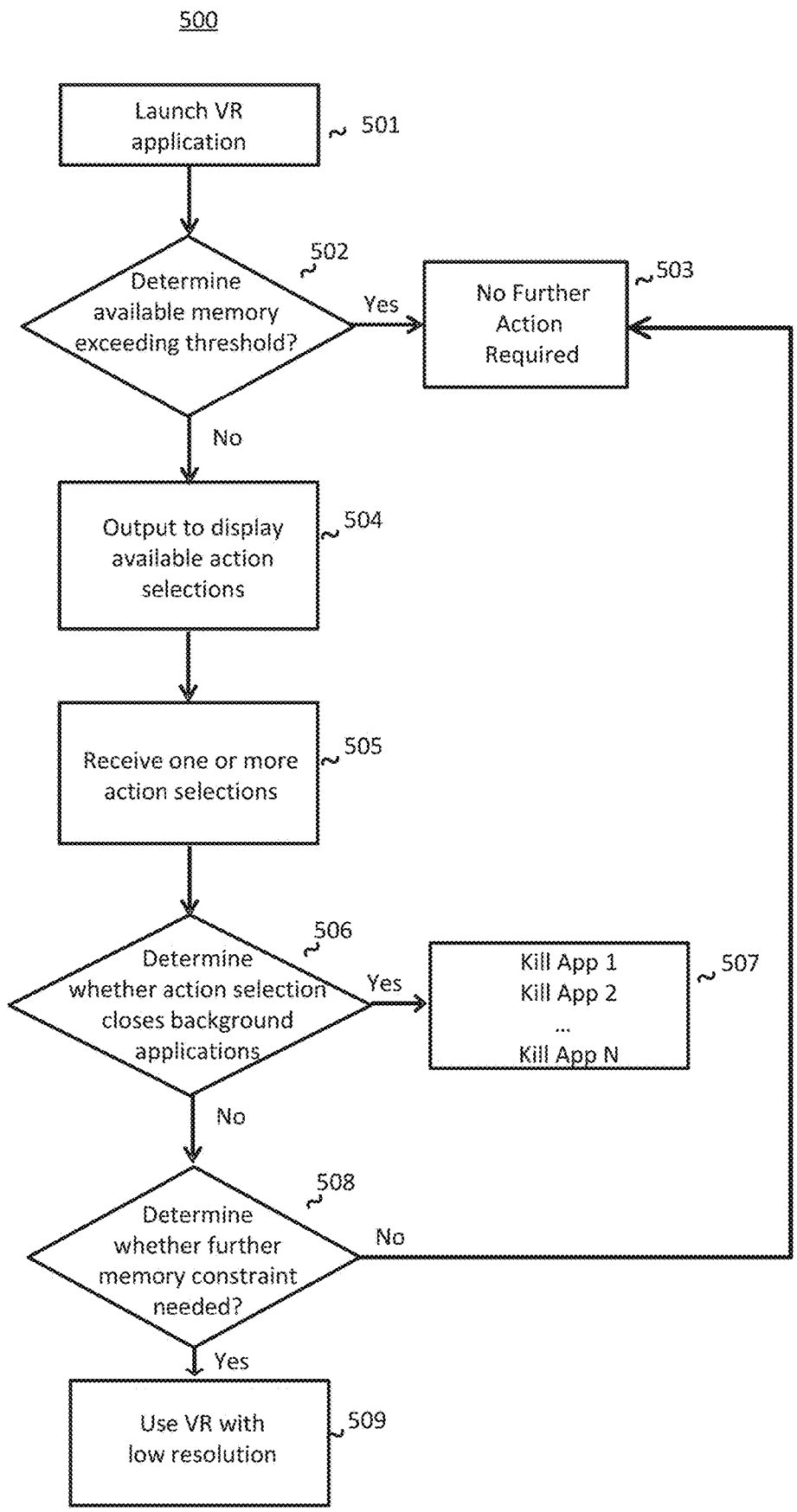
FIG. 5 illustrates an exemplary procedure allowing a user to manage low VR memory events.

Another exemplary embodiment of the present principles is a low VR memory alert procedure 500 of FIG. 5, which allows controller 102 to handle events where insufficient space is available in volatile memory 106 to support VR operations. While the flow chart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The process depicted in the example depicted is implemented by a processor in, for example, a head mounted electronic device or a wearable electronic device.

In response to user commands, controller 102 launches a VR application at Block 501 and then makes periodic determinations as to whether sufficient volatile memory 106 is available to support VR operations (Block 502). If sufficient volatile memory space is available (i.e., is above a selected threshold), then no further action is required (Block 503). (This threshold may be set, for example, by user selection, a default setting, the type of VR app being executed, and/or the type of VR content).

Figure 4B:
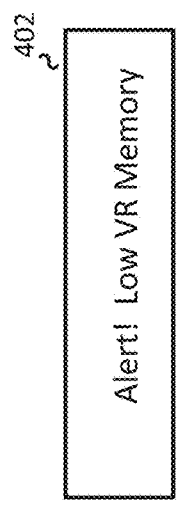

On the other hand, if insufficient space is available to support VR operations, then controller 102 presents a low VR memory alert to the user on the display 107 of VR HMD device 101, for example, through a pop-up, such as pop-up 402 of FIG. 4B. Controller 102 also presents user action options, at Block 504, for example, to terminate one or more non-essential apps to increase the available memory space and/or to operate in the VR mode with lower display resolution (e.g., run in the VR mode with a grey scale display).

At Block 505, controller 102 may receive one or more action selections through user input device 110. If the selected action is to close one or more background applications (Block 506), then the selected application or applications are killed at Block 507. Otherwise, at Block 508, controller determines whether further constraints on volatile memory use are required. If not, then procedure 500 returns to Block 503, and controller 102 take no further action. However, if further constraints on volatile memory use are required, the controller 102 runs VR content on display 107 in a low resolution mode (Block 509).

Figure 6:
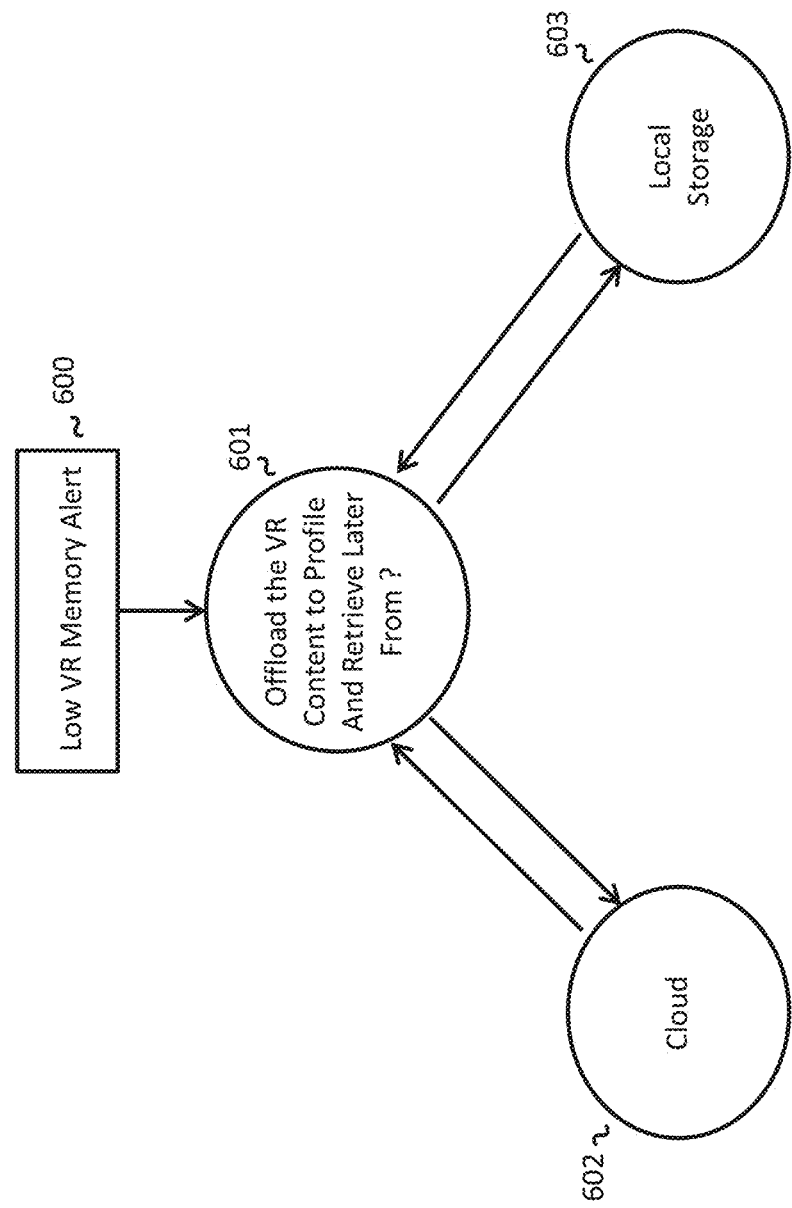
FIG. 6 illustrates an exemplary procedure allowing a user to manage low VR memory events.

In another low VR memory alert procedure 600 of FIG. 6, the user may be given the option of offloading VR content to a profile in storage off of VR HMD device 101 for later retrieval (Block 601). In this example, controller 102 presents to the user the choice of offloading to at least one of Cloud 1 114, Cloud 2 115, or Cloud n 116 of FIG. 1 at Block 602, or to local storage 111 of FIG. 1 at Block 603.

Figure 7:
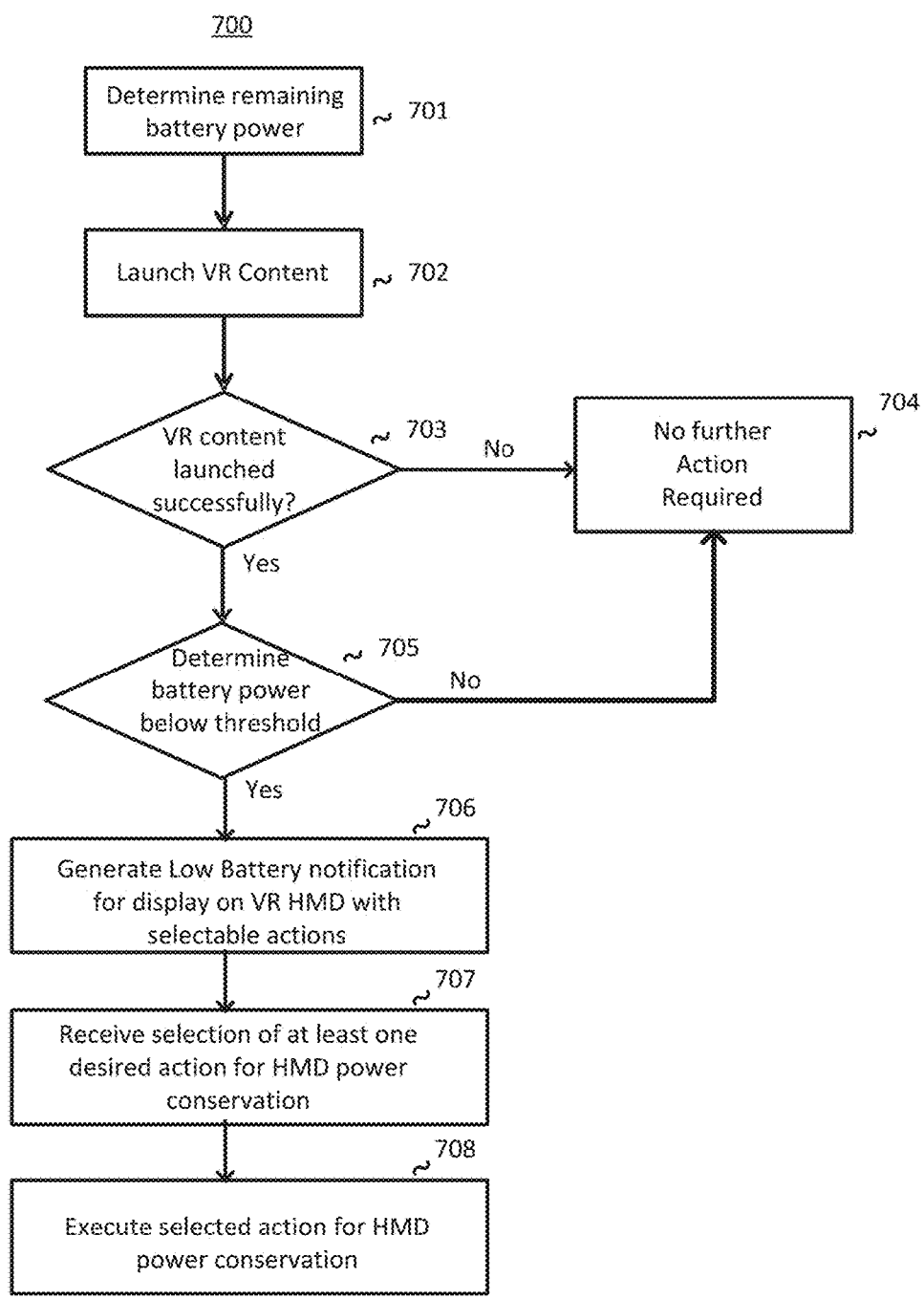
FIG. 7 illustrates an exemplary procedure allowing a user to manage low battery events.

Additional embodiments of the present invention address situations in which VR HMD device 101 is running low on battery power. FIG. 7 illustrates a procedure 700 for addressing low battery power operation. (In the example of FIG. 7, a "low battery" condition occurs when the remaining battery power falls to 15% or less; however, the threshold at which a low battery condition occurs may vary upward or downward, depending on the particular embodiment and may be set by the user in advance.)

At Block 702, controller 102 determines the remaining battery power (Block 701) and then attempts to launch VR content (Block 702). If the VR content does not successfully launch (Block 703), then no further action is required (Block 704). (A failure to successfully launch under low battery condition may result at Block 703, for example in: (1) the VR content launching for a few seconds, depending on the size of the VR content, followed by VR HMD device 101 exiting the VR mode; (2) VR HMD device 101 exiting the VR mode and the home screen appearing on display 107 of VR HMD device 101; or (3) the VR content initiating but then terminating with unexpected behavior, such as a black screen, reboot, or a similar anomaly).

Figure 4C:
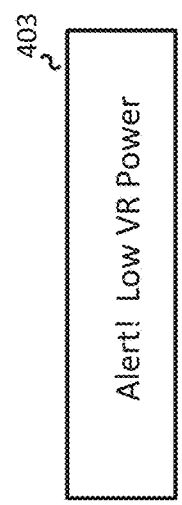

Otherwise, if the VR content successfully launches, then at Block 705, controller 102 determines whether the available battery power is below a selected threshold. If the available battery power is above the threshold, then no further action is required and procedure 700 returns to Block 704. On the other hand, if the remaining battery power is below the selected threshold, then at Block 706, controller 102 presents a low battery notification pop-up, which can include selectable actions, on the screen of display 107 of VR HMD device 101. An example low battery power alert pop-up screen 403 is shown in FIG. 4C, although the content and appearance of this pop-up screen may vary from embodiment to embodiment.

Controller 102 may receive one or more user selections for reducing HMD power consumption through user input device 110 (Block 707). Some exemplary options include reducing display 107 brightness, running the VR mode in grey scale on display 107, terminating non-VR and/or non-essential VR apps running in the background, terminating WiFi functions, terminating Bluetooth functions, and terminating GPS functions. These options are merely exemplary, and in alternate embodiments, the user may be given the option of reducing battery power consumption by modifying or terminating other operations being performed by VR HMD device 101.

At Block 708, controller 102 executes the selected action for reducing the power consumption of VR HMD device 101.

Figure 4D:
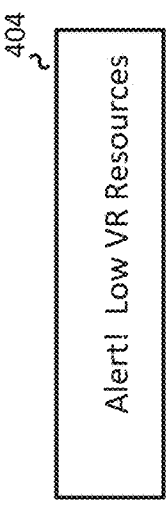
Figure 4E:
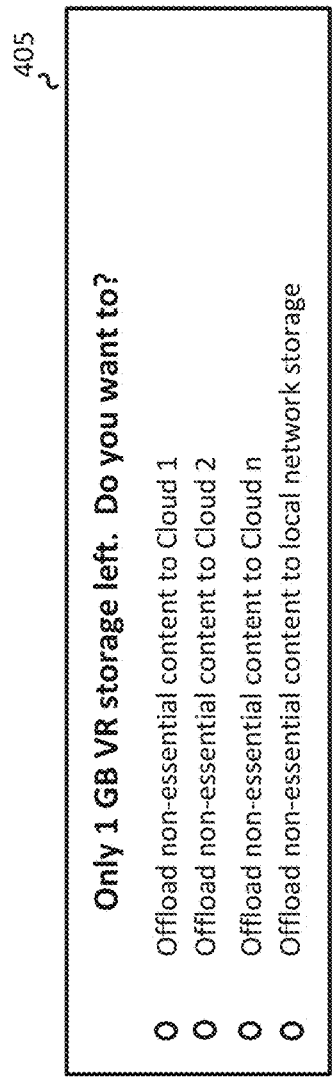

Generally, as shown in FIG. 4D, whenever a given resource or set of resources, including memory, storage, or remaining battery power are running low, the user is provided an alert 404 on display 107 of VR HMD device 101. The user is then provided with a pop-up, similar to pop-up 405, which allows the user to manage the low resource condition, for example through user input device 110, without taking off VR HMD device 101.

It should be noted that the illustrated regions of the figures are merely examples. Also, it should be noted that although the above illustrations are shown in two dimensions, the zones are often three dimensional. It also should be noted that for clarity and ease of illustration, the figures are not necessarily made to scale.

While the above detailed diagrams have shown, described, and pointed out novel features of the invention as applied to various embodiments, it will be understood that various omissions, substitutions, and changes in the form and details of the device or process illustrated may be made by those skilled in the art without departing from the invention. This description is in no way meant to be limiting, but rather should be taken as illustrative of the general principles of the invention.

Though embodiments have been described with reference to certain versions thereof; however, other versions are possible. Therefore, the spirit and scope of the embodiments should not be limited to the description of the preferred versions contained herein.

It is therefore contemplated that the claims will cover any such modifications or embodiments that fall within the true scope of the invention.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle.

What is claimed is:

1. A virtual reality (VR) head mounted display (HMD) device comprising:
 a display;
 a memory; and
 a processor coupled to the display and configured to:
  determine the HMD device is operating in a mixed reality (XR) mode,
  determine that an available capacity of a resource supporting VR operations being executed by the processor is insufficient, and
  present a graphical user interface on the display with a plurality of selectable options to reduce usage of at least one resource supporting at least one of non-VR operations and inactive VR operations, wherein a first option of the plurality of selectable options is configured to reduce usage of a first resource and a second option of the plurality of selectable options is configured to reduce usage of a second resource, the plurality of selectable options based on whether the HMD device is operating in the XR mode.

2. The HMD device of claim 1, wherein:
to determine that the available capacity of a resource supporting VR operations being executed by the processor is insufficient, the processor is further configured to determine that the available capacity of a storage space is insufficient to support active VR operations; and
to present a graphical user interface on the display, the processor is further configured to present an option to offload a selected one of non-VR content and inactive VR content to storage outside the HMD device.

3. The HMD device of claim 2, wherein the storage outside the HMD device comprises at least one of cloud storage and local storage.

4. The HMD device of claim 1, wherein:
to determine that the available capacity of a resource supporting VR operations being executed by the processor is insufficient, the processor is further configured to determine that the available capacity of a memory space is insufficient to support active VR operations; and
to present a graphical user interface on the display, the processor is further configured to present on the display at least one of an option to terminate a selected application being executed by the processor, an option to execute VR operations by the processor in a low resolution mode, or an option to offload VR content to storage outside the HMD device.

5. The HMD device of claim 1, wherein:
to determine that the available capacity of a resource supporting VR operations being executed by the processor is insufficient, the processor is further configured to determine that a remaining charge of a battery is insufficient to support active VR operations; and
to present a graphical user interface on the display, the processor is further configured to present, on the display, a selectable low power operating mode option for the HMD device.

6. The HMD device of claim 5, wherein the selectable low power operating mode option comprises at least one of an option to reduce device brightness, an option to display VR data in grayscale, an option to terminate a background application, an option to terminate Bluetooth operations, an option to terminate WiFi operations, and an option to terminate global positioning system (GPS) operations.

7. The HMD device of claim 1, wherein the graphical user interface comprises a selectable option to continue VR operations without reducing usage of at least one resource supporting non-VR or inactive VR operations.

8. A method of operating a virtual reality (VR) head mounted display (HMD) device including a processor, a display coupled to the processor, and a memory coupled to the processor and including instructions executable by the processor, comprising:
determining, by the processor, that the HMD device is operating in a mixed reality (XR) mode;
determining, by the processor, that an available capacity of a resource supporting VR operations being executed by the processor is insufficient; and
displaying on the display, by the processor, a graphical user interface with a plurality of selectable options to reduce usage of at least one resource supporting at least one of non-VR operations and inactive VR operations, wherein a first option of the plurality of selectable options is configured to reduce usage of a first resource and a second option of the plurality of selectable options is configured to reduce usage of a second resource, the plurality of selectable options based on whether the HMD device is operating in the XR mode.

9. The method of claim 8, wherein:
determining that the available capacity of a resource supporting VR operations being executed by the processor is insufficient further comprises determining that the available capacity of a storage space is insufficient to support active VR operations; and
displaying on the display a graphical user interface further comprises presenting an option to offload a selected one of non-VR and inactive VR content to storage outside the HMD device.

10. The method of claim 9, wherein the storage outside the HMD device comprises at least one of cloud storage and local storage.

11. The method of claim 8, wherein
determining that the available capacity of a resource supporting VR operations being executed by the processor is insufficient further comprises determining that the available capacity of a memory space is insufficient to support active VR operations; and
displaying on the display a graphical user interface further comprises displaying at least one of: an option to terminate a selected application being executed by the processor, an option to execute VR operations by the processor in a low resolution mode, or an option to offload VR content to storage outside the HMD device.

12. The method of claim 8, wherein
determining that the available capacity of a resource supporting VR operations being executed by the processor is insufficient further comprises determining that a remaining charge of a battery is insufficient to support active VR operations; and
displaying on the display a graphical user interface further comprises displaying a selectable low power operating mode for the HMD device.

13. The method of claim 12, wherein the selectable low power operating mode option comprises at least one of an option to reduce device brightness, an option to display VR data in grayscale, an option to terminate a background application, an option to terminate Bluetooth operations, an option to terminate WiFi operations, and an option to terminate global positioning system (GPS) operations.

14. The method of claim 8, wherein displaying the graphical user interface further comprises displaying a selectable user option to continue VR operations without reducing usage of at least one resource supporting non-VR or inactive VR operations.

15. A non-transitory computer-readable medium including a plurality of instructions that, when executed by a processor of a virtual reality (VR) head mounted display (HMD) device, are configured to cause the processor to:
determine that the HMD device is in operating in a mixed reality (XR) mode,
determine that an available capacity of a resource supporting VR operations being executed by the processor is insufficient; and
display, on the HMD a graphical user interface, a plurality of selectable options to reduce usage of at least one resource supporting at least one of non-VR operations and inactive VR operations, wherein a first option of the plurality of selectable options is configured to reduce usage of a first resource and a second option of the plurality of selectable options is configured to reduce usage of a second resource, the plurality of selectable options based on whether the HMD device is operating in the XR mode.

16. The non-transitory computer-readable medium of claim 15, wherein the plurality of instructions is further configured to cause the processor to:
 determine that the available capacity of a resource supporting VR operations being executed by the processor is insufficient by determining that the available capacity of a storage space is insufficient to support active VR operations; and
 display on the HMD a graphical user interface by presenting an option to offload a selected one of non-VR and inactive VR content to storage outside the HMD device.

17. The non-transitory computer-readable medium of claim 15, wherein the plurality of instructions is further configured to cause the processor to:
 determine that the available capacity of a resource supporting VR operations being executed by the processor is insufficient by determining that the available capacity of a memory space is insufficient to support active VR operations; and
 display on the HMD a graphical user interface by displaying on the HMD a graphical user interface with at least one of: an option to terminate a selected application being executed by the processor, an option to execute VR operations by the processor in a low resolution mode, or an option to offload VR content to storage outside the HMD device.

18. The non-transitory computer-readable medium of claim 15, wherein the plurality of instructions is further configured to cause the processor to:
 determine that the available capacity of a resource supporting VR operations being executed by the processor is insufficient by determining that a remaining charge of a battery is insufficient to support active VR operations; and
 display on the HMD a graphical user interface by displaying a selectable low power operating mode for the HMD device.

19. The non-transitory computer-readable medium of claim 18, wherein the selectable low power operating mode for the HMD device comprises at least one of an option to reduce device brightness, an option to display VR data in grayscale, an option to terminate a background application, an option to terminate Bluetooth operations, an option to terminate WiFi operations, and an option to terminate global positioning system (GPS) operations.

20. The non-transitory computer-readable medium of claim 15, wherein the graphical user interface comprises a selectable user option to continue VR operations without reducing usage of at least one resource supporting non-VR or inactive VR operations.

* * * * *